(12) United States Patent
Kawai et al.

(10) Patent No.: US 6,470,340 B1
(45) Date of Patent: Oct. 22, 2002

(54) INTER-PROGRAM LINKING SYSTEM AND METHOD THEREOF

(75) Inventors: Emiko Kawai; Shoji Yamamoto; Yoshio Kashimura; Kenichi Uemura; Takamitsu Inagi, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/002,843

(22) Filed: Jan. 5, 1998

(30) Foreign Application Priority Data

Feb. 14, 1997 (JP) ............................................. 9-030725

(51) Int. Cl.[7] ............................................. G06F 17/00
(52) U.S. Cl. ........................ 707/10; 709/106; 709/319
(58) Field of Search ................................. 709/100–332; 707/513, 1–206; 714/15; 380/25

(56) References Cited

U.S. PATENT DOCUMENTS

| | | | | |
|---|---|---|---|---|
| 5,761,683 A | * | 6/1998 | Logan et al. ................ 707/513 |
| 5,774,660 A | * | 6/1998 | Brendel et al. .............. 709/201 |
| 5,784,562 A | * | 7/1998 | Diener ........................ 709/217 |
| 5,809,250 A | * | 9/1998 | Kisor .......................... 709/227 |
| 5,907,621 A | * | 5/1999 | Bachman et al. ............. 380/25 |
| 5,951,694 A | * | 9/1999 | Choquier et al. ............. 714/15 |
| 6,021,435 A | * | 2/2000 | Nielsen ....................... 709/224 |

\* cited by examiner

Primary Examiner—David Jung
(74) Attorney, Agent, or Firm—Staas & Halsey LLP

(57) ABSTRACT

To perform a link process between a device or a program which makes a connectionless communication and a device or a program which makes a connection communication, a service system is arranged in between. This process is performed via the service system. With this service system, an operating process which is generated and extinguished at each session is generated on a connectionless communication side, while a communication process which stays resident and maintains a line on a connection communication side, so that the link process is implemented by making a communication between the operating process and the communication process.

27 Claims, 11 Drawing Sheets

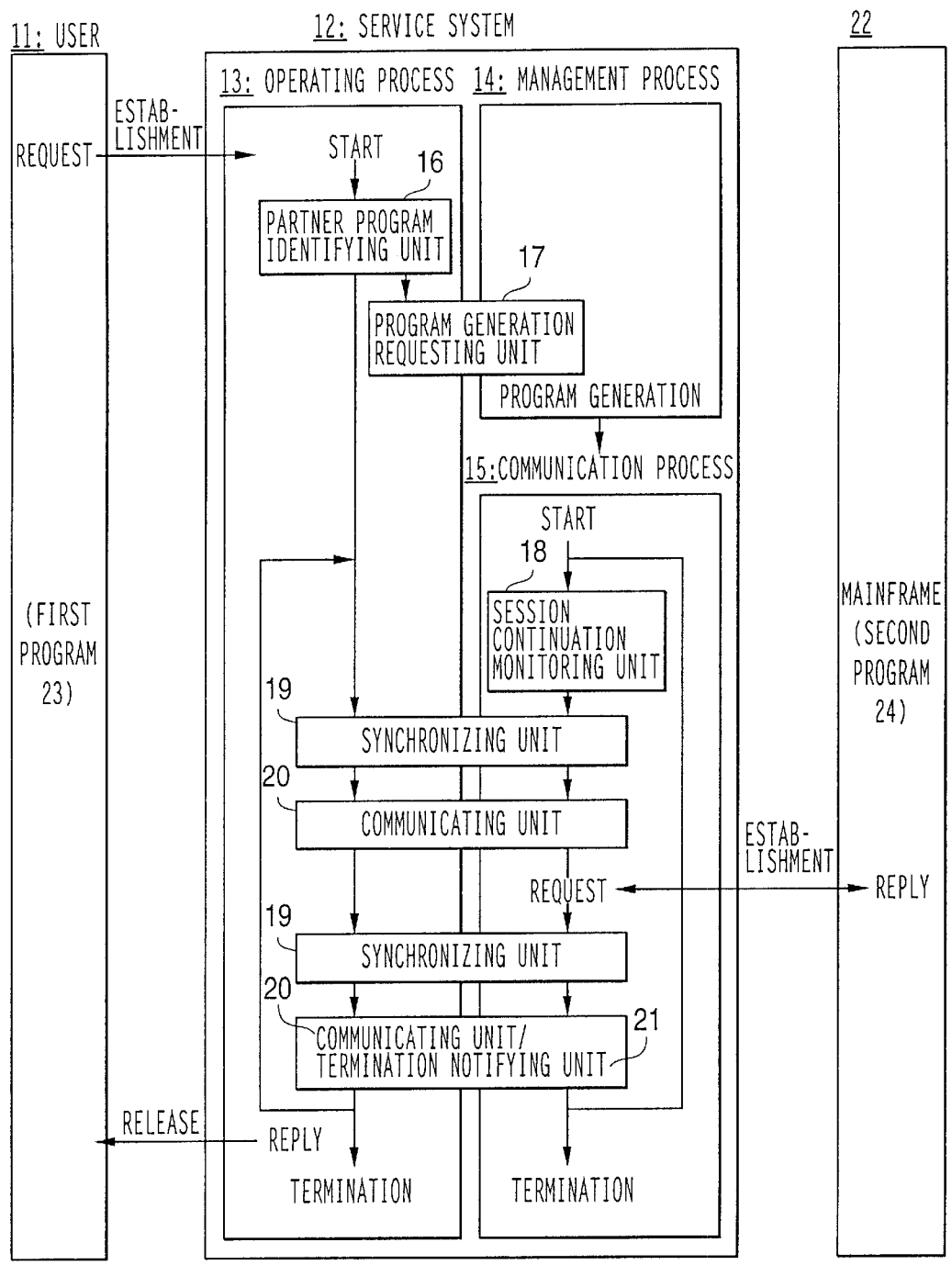

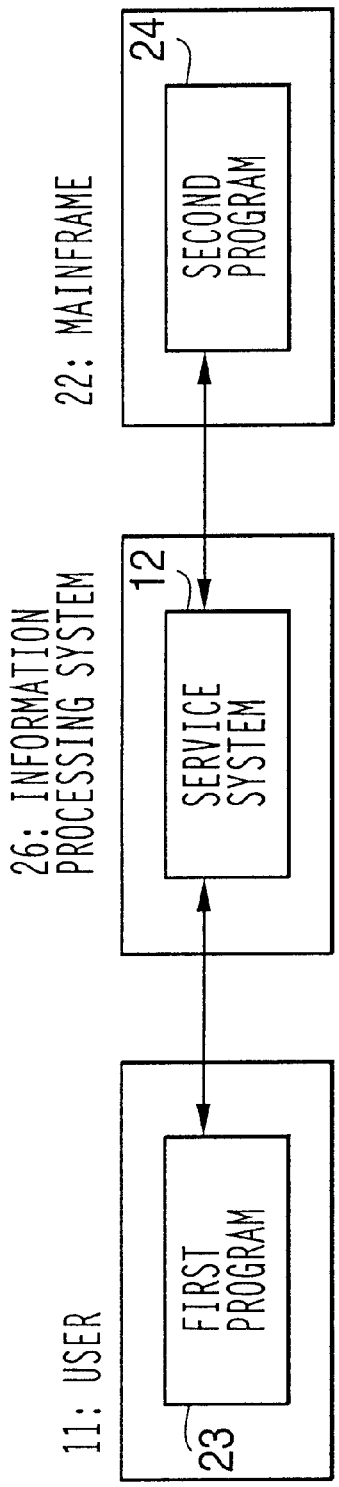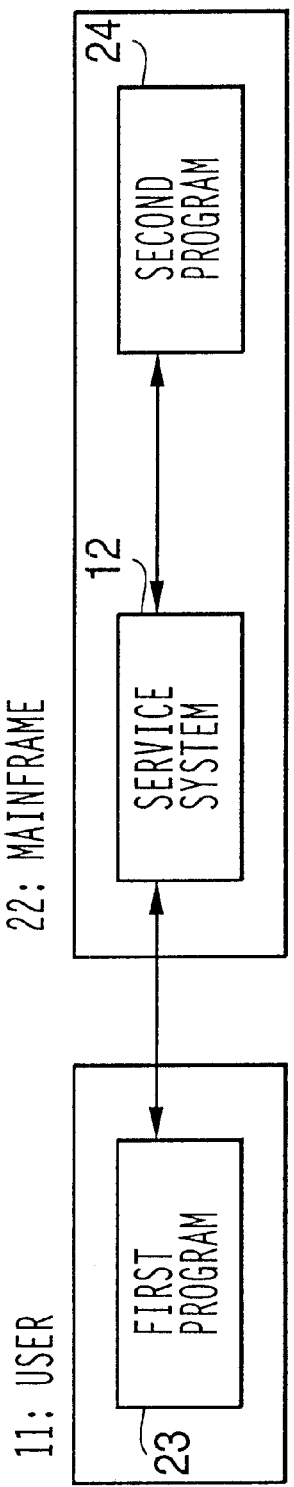

INTER-PROGRAM LINKING SYSTEM AND METHOD THEREOF

BACKGROUND OF THE INVENTION

1. Field of the Invention

The present invention relates to an inter-program linking system for linking transmission/reception of data between programs.

2. Description of the Related Art

As the Internet rapidly becomes popular, the demand for linking a WWW server and a mainframe (host) is on the rise.

Since the HTTP (Hyper Text Transfer Protocol) normally used by a WWW browser is connectionless, its session is established when the browser requests a page, and is released when a WWW server transmits the page. Accordingly, another session is established and the association with the previous communication is not maintained, when the next page is accessed. Therefore, when a user accesses the WWW server via the WWW browser, a program invoked by the WWW server accepts a request made by the user, performs a process, and returns the result to the user. The session between the program and the user, however, is released after only a single request-reply operation is performed.

With a client-server system in which a mainframe is used as a server, once a user (client) logs in and establishes a session, he or she can normally and sequentially perform various processes in a state in which the session between the server and the user is maintained.

Accordingly, to link the WWW server and the mainframe, a particular program invoked by the WWW server when a user makes an access must be linked to a program running on a client side when a mainframe is used as a server, in order to maintain the connection state between these programs.

There are two methods for a conventional inter-program linking system: one is a connectionless method shown in FIG. 1A with which a server (a program providing a service) performs a process corresponding to a request and returns a reply when a client (a program requesting and receiving a service) issues the request, so that the processes between the client and the server are completed and the connection between them is released with a single request-reply operation; and the other is a connection method shown in FIG. 1B with which the connection between the client and the server is maintained in order to repeat various process requests and replies until the client requests the server to release the connection, once the client establishes the connection to the server.

With the former method shown in FIG. 1A, when a client process 1 issues a request, a server process 2 performs the process corresponding to the request, and returns its result. When the process is completed, the connection is released.

With the latter method shown in FIG. 1B, when a client process 3 initially issues a request, it establishes a connection to a server process 4. After several requests-replies are repeated, the connection is released by a release request made by the client process 3.

Additionally, with the method for generating a process in the conventional inter-program linking system, one server process is generated for one client process, and a communication is made in a one-to-one correspondence, as shown in FIG. 1C.

The above described conventional inter-program linking system has the problem that the program whose session connection state is released after a single request-reply operation is made as shown in FIG. 1A, cannot be linked to the program whose session connection state is maintained and request-reply operations are repeated.

Additionally, the process generating method requires the troublesome process in which a connection request must be again issued to a server process in order to communicate with the server process after a client process terminates with the former method shown in FIG. 1A, that is, the connection request must be issued for establishing each connection.

SUMMARY OF THE INVENTION

An object of the present invention is to provide an inter-program linking system for linking programs whose session continuation forms are different, and a method thereof.

The inter-program linking system according to the present invention is intended to link a program running on a first information processing device which makes a connectionless communication, and a program running on a second information processing device which makes a connection communication. This system comprises an operating process generating unit and a communication process generating unit.

The operating process generating unit generates an operating process for communicating with the first information processing device in correspondence with a user ID for uniquely identifying a transmission source, which is attached to data, upon receipt of the data from the first information processing device.

The communication process generating unit generates a communication process, which corresponds to the user ID, for communicating with the second information processing device which is instructed by the data, according to an instruction from the operating process.

The communication between the operating process and the communication process is performed, for example, via a user file.

In this case, the operating process determines whether or not the user file corresponding to the user ID exists, and writes the data received from the first information processing device to the user file if it exists. If the user file does not exist, the operating process requests the communication process generating unit to generate the communication process, generates the user file corresponding to the user ID, and writes the data received from the first information processing device to the user file.

Furthermore, the communication process reads out the data written by the operating process from the user file corresponding to the same user ID as that corresponding to the communication process itself, transmits the read data to the second information processing device, and writes the process result received from the second information processing device to the user file. The operating process implements a link by reading out the process result written by the communication process from the user file.

The communication between the operating process and the communication process may comprise queues, and is made by using the queues.

In this case, the operating process generating unit generates the operating process which is received from the first information processing device and corresponds to the first data, and can generate a new operating process for newly received data before the previous operating process gives a reply to the first data for the first processing device, so that it can implement a parallel process.

With the inter-program linking system according to the present invention, an operating process is generated and extinguished in each session on a connectionless communication side, while a communication process stays resident and maintains a connection on a connection communication side, so that a link process is implemented by making a communication between the operating process and the communication process.

BRIEF DESCRIPTION OF THE DRAWINGS

FIG. 2 is a schematic diagrams showing the principle of the present invention;

FIG. 3A is a schematic diagram showing the case in which a service system 12 is arranged in an information processing device different from a mainframe 22;

FIG. 3B is a schematic diagram showing the case in which the service system 12 is arranged in the mainframe 22;

DESCRIPTION OF THE PREFERRED EMBODIMENTS

Figure 1A:
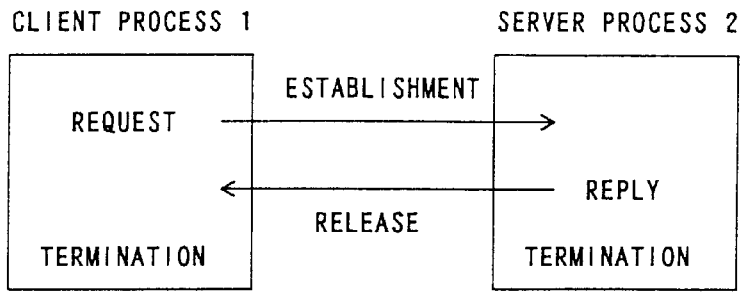
FIGS. 1A, 1B, and 1C are schematic diagrams showing conventional techniques.
Figure 1B:
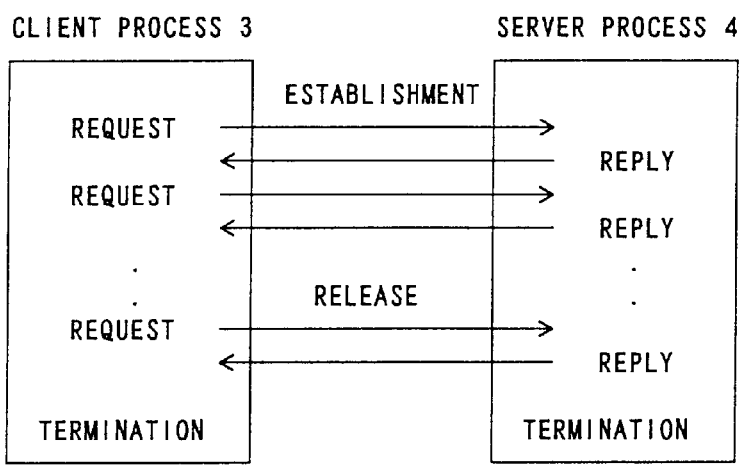
Figure 1C:
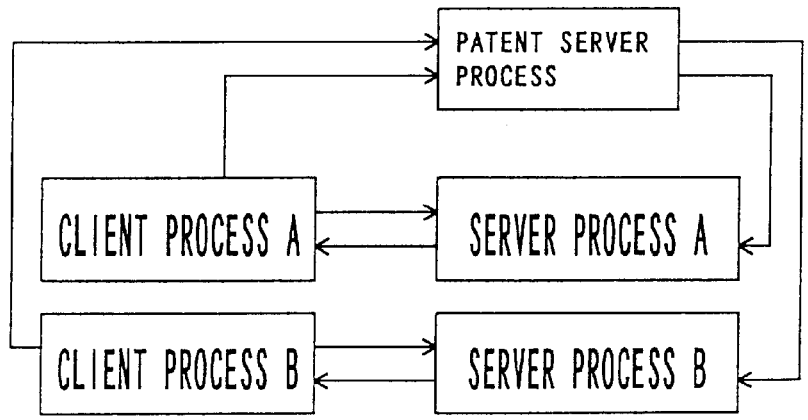

Provided below is the explanation about the principle of the operations according to the present invention, by referring to FIG. 2.

In FIG. 2, a user 11 is, for example, a network terminal running based on a first program such as a program for requesting a service, a WWW browser, etc., and makes a connectionless communication.

A mainframe 22 is an information processing device for making a connection communication, which is selected by data transmitted from the user 11, and processes a request from the user 11, such as a database process, etc. based on a second program 23.

A service system 12 is arranged between the user 11 and the mainframe 22 in order to link the first program 23 of the user 11 and the second program 24 of the mainframe 22. The user 11 and the mainframe 22 are communicated with each other via the service system 12.

The service system 12 may be arranged in an information processing system 26 which is different from the user 11 and the mainframe 22 as shown in FIG. 3A in order to reduce a process load, or may be arranged in the mainframe 22 as shown in FIG. 3B.

Additionally, the service system 12 may be arranged for the mainframe 22 in a one-to-one correspondence, or may be arranged for a plurality of main frames 22 in a one-to-plural correspondence.

The service system 12 is intended to reply to a service request made by the user, and to exchange data between the user 11 and the mainframe 22 here. The service system 12 is composed of an operating process 13, a management process 14, a communication process 15, etc.

The operating process 13 is intended to make a connection to the user 11, and is invoked upon receipt of a request (data) transmitted from the user 11. After the operating process 13 requests the management process 14 to generate/invoke the communication process 15, and returns the result to the user 11, it is terminated and extinguished.

The management process 14 is intended to generate/invoke the communication process in response to the request made from the operating process 13. Additionally, the management process 14 is intended to load the information required by the communication process 15 into a memory in order to reduce the load on the communication process 15. The processes that the management process 15 performs for reducing the load on the communication process 14 are the process for loading the information required by the communication process 15, such as an environment definition file describing a timer monitoring time, the number of users that the mainframe 22 can maintain, etc., system information, and the like, which impose a considerable load on the communication process 15.

The communication process 15 is intended to make a connection to the mainframe 22. This process is generated for each user, and is managed according to an ID for uniquely identifying a user. The communication process 15 receives a request (data) from the operating process 13, transmits it to the mainframe 22, returns the reply (data) from the mainframe 22 to the operating process 13, etc. It stays resident, and maintains the connection to the mainframe 22 until a termination request is issued.

A partner program identifying unit 16 in the operating process 13 determines whether or not a user file having a user ID as an identifier was generated, if the user ID is given as a request (data) or if the request (data) includes the user ID, upon receipt of the request (data) from the user 11. If "YES", there is no need to generate the user file. Therefore, the partner program identifying unit 16 passes the process to a synchronizing unit 19. If "No", the partner program identifying unit 16 notifies a program generation request unit 17 in order to request the management process 14 to generate/invoke the user file.

The program generation requesting unit 17 is intended to request the management process 14 to generate/invoke the communication process 15 and to generate a user file, if the user file having the user ID included in the received request (data) as an identifier is not found.

A session continuation monitoring unit 18 is intended to monitor a session between the user 11 and the mainframe 22. For example, it monitors the session between the user 11 and the mainframe 22 by monitoring whether or not the operating process 13 performs a write operation to the user file during a predetermined period, according to the result of polling of the user file.

The synchronizing unit 19 monitors whether or not the communication process 15 or the operating process 13 performs a write operation to the user file by polling the user file. As the method for implementing the polling process, various methods such as a method for reading out a file at predetermined time intervals, a method using a flag, etc. can be considered.

A communicating unit 20 is intended to exchange data between the operating process 13 and the communication process 15, and to exchange data via a user file here.

Provided next is the explanation about the summary of the operations performed when the user 11 and the mainframe 22 perform a link process via the service system 12.

When the service system 12 receives the data from the first program, the operating process 13 is generated.

The data from the user 11 is attached with the user ID for uniquely identifying each user 11. The operating process 13 determines whether or not the received data is the initial data transmitted from the user 11 according to the user ID. If the received data is determined to be the initial data, the service system 12 makes the management process 14 generate the communication process 15 in correspondence with the user ID. The data from the user 11 is then passed to the communication process 15. If the received data is not the initial data, the communication process 15 corresponding to this user ID was previously generated. Therefore, the data from the user 11 is passed to the previously generated communication process 15.

The communication between the operating process 13 and the communication process 15 is implemented, for example, by using a named pipe of UNIX, Windows NT, etc. On receiving the data from the user 11 in this case, the operating process 13 determines whether or not the received data is the initial data from the user 11 depending on whether or not the user file having the file name corresponding to the user ID exists. If "YES", the operating process 13 requests the management process 14 to generate the communication process 15, and at the same time, it generates the user file having the file name corresponding to the user ID. Then, the operating process 13 transmits the data attached with the user ID to the communication process 15 via the user file, and receives the process result from the communication process 15 via the user file.

For example, the operating process 13 stores the data received from the user 11 in the user file corresponding to the user ID attached to that data. The communication process 15 extracts the data from the user file, and transmits the extracted data to the mainframe 22. On receiving the process result from the mainframe 22, the communication process 15 stores the received result in the corresponding user file. The operating process 13 then extracts the result from the user file, and transmits it to the user 11.

In the communication between the operating process 13 and the communication process 15 using the user file according to a named pipe, it is determined whether or not the communication process 15 or the operating process 13 performs a write operation to the user file by polling the user file.

Additionally, the communication process 15 polls the user file in order to determine whether or not data is written to the user file. If the operating process 13 does not perform a write operation to the user file although a predetermined amount of time elapses, the communication process 15 performs an error process.

As the error process, the communication process 15, for example, requests re-transmission of the data to the first program of the user 11, or inquires whether or not the communication between the mainframe 22 and the user 11 is suspended by terminating the link process, etc. If the communication is suspended, the communication process 15 is terminated/extinguished.

The communication between the operating process 13 and the communication process 15 may be implemented also by arranging queues.

In this case, the service system 12 may make the communication process 15 pass the received data to the second program 24 of the mainframe 22, receive the next data from the user 11 while making the mainframe 22 perform the process for the received data, pass also the newly received data to the mainframe 22, and perform the processes for these two data in parallel.

Furthermore, the service system 12 has the capability for inquiring of the user 11 whether or not to reduce a load if the load on the communication process 15 becomes heavier with the increase of the amount of received data.

As described above, the present invention allows the system for linking programs (first and second programs) whose session continuation states are different and efficiently generating a process, to be built.

Provided next is the explanation about the details of the configuration and the operations of the preferred embodiment according to the present invention, by referring to FIGS. 4 through 11.

Figure 4:
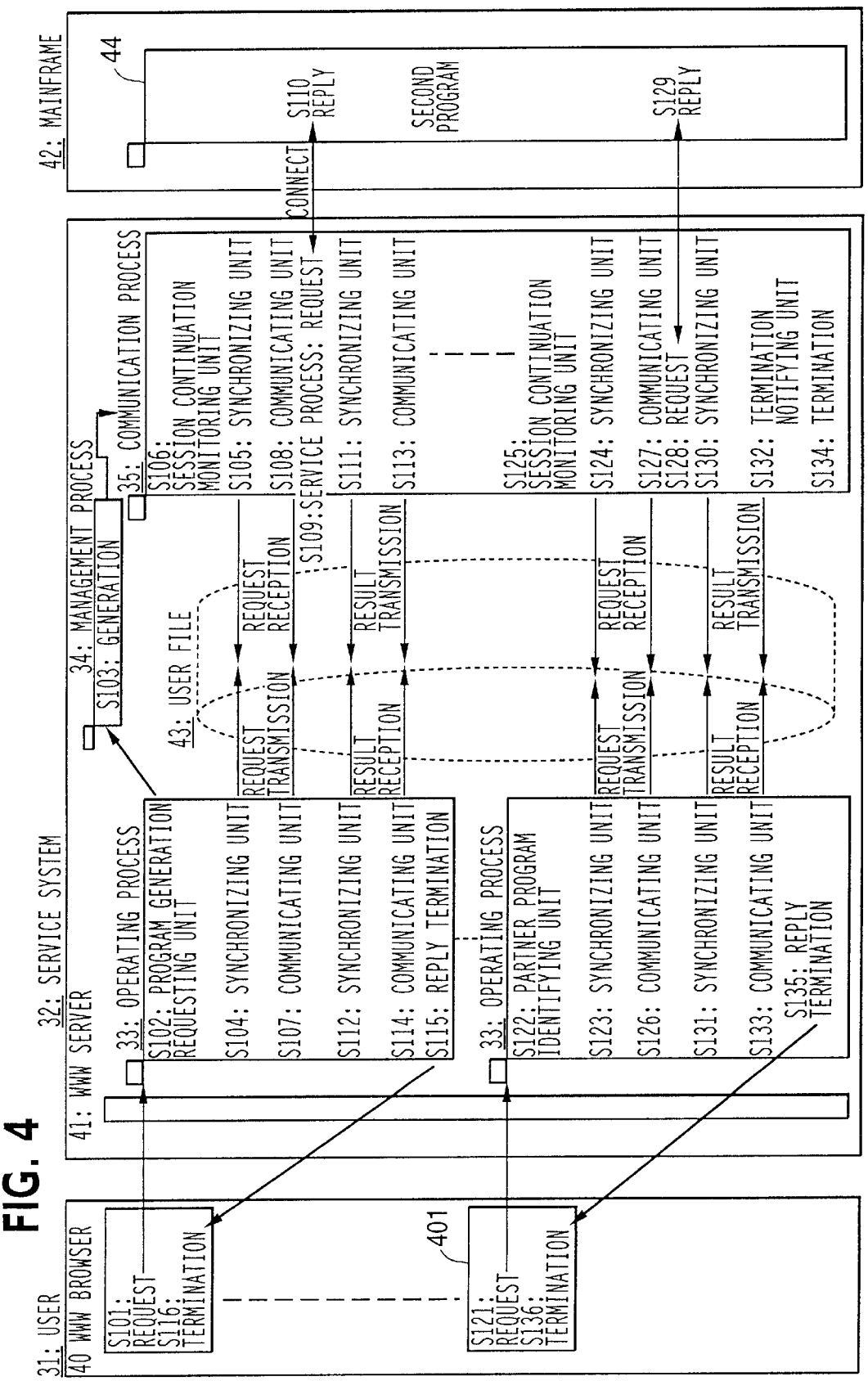
FIG. 4 is a schematic diagram showing the configuration and the operations of a service system using a named pipe.

Provided first is the explanation about the case in which a communication is made by using the program generation requesting unit 17, the session continuation monitoring unit 18, the synchronizing unit 19, and the communicating unit 20, which are shown in FIG. 2, by referring to FIG. 4.

FIG. 4 is a schematic diagram showing the configuration of a first embodiment according to the present invention, which is implemented by using a named pipe.

In this figure, a WWW browser 40 corresponds to a first program of a user 31, and is a WWW browser (program) used on the Internet.

A WWW server 41 is intended to provide a service in response to a request made from the WWW browser 40, and is a WWW server (program) used on the Internet.

A second program 44 is a program for performing a process which actually provides various services within a mainframe 42.

The session between the WWW browser 40 and the WWW server 41 in the service system 32 is released at each access. An operating process 33 responsible for a connection at each access is generated. When an access is terminated, also the operating process 33 is terminated/extinguished.

The communication process 35 is responsible for the session between the service system 32 and the mainframe 42. The communication process 35 resides in the service system 32 and maintains the connection to the mainframe 42 until the user 31 issues a termination request after the link process between the user 31 and the mainframe 42 is completed, or until a release process due to an error is performed.

Provided next is the explanation about the details of the operations.

In FIG. 4, the WWW browser 40 makes a connection to the operating process 33 configuring the service system 32, and transmits a service request in step S101.

In step S102, the operating process 33 notifies the management process 34 of a request to generate/invoke the communication process 35 by using the program generation requesting unit.

In step S103, the management process 34 generates/invokes the communication process 35 in response to the notification made in step S102.

In steps S104 and S105, the synchronizing unit performs a polling process, and determines whether or not the operating process 33 writes the request to the user file 43.

In step S106, the session continuation monitoring unit in the communication process 35 monitors whether or not the operating process 33 writes the request (data) from the WWW browser 40 to the user file 43 during a predetermined period according to the result of the polling process performed by the synchronizing unit. If the write operation to the user file 43 is not performed and the predetermined amount of time elapses, the session continuation monitoring unit determines that the communication with the user 31 is completed, and terminates the communication process.

If the communicating unit in the operating process 33 writes the request to the user file 43 in step S107, the communicating unit in the communication process 35 reads the written request from the user file 43 when the synchronizing unit detects the write operation of the request, in step S108. As a result, the request is transmitted from the operating process 33 to the communication process 35.

In step S109, the communication process 35 transmits a service process request to the mainframe 42.

In step S110, the second program 44 in the mainframe 42 returns the result of the process to the communication process 35 as the reply to the service process request made by the user 31.

In steps S111 and S112, the synchronizing unit determines whether or not the write operation was performed to the user file 43 by performing the polling process.

If the communicating unit of the communication process 35 writes the process result received from the mainframe 42 to the user file 43 in step S113, the communicating unit of the operating process 33 reads the written result from the user file 43 when the synchronizing unit detects the write operation, in step S114. As a result, the reply is transmitted from the communication process 35 to the operating process 33.

In step S115, the operating process 33 returns the process result to the user 31 as a reply, and terminates its process.

In step S116, the WWW browser 40 terminates its process.

In the above described steps S101 through S116, the operating process 33 terminates its process and disappears after it performs the transmission/reception to/from the WWW browser 40 once in a one-to-one correspondence. In the meantime, the communication process 35 resides in the service system 32 and enters into a wait state after the second program 44 in the mainframe 42 performs the transmission/reception once in a one-to-one correspondence.

Thereafter, each time the service system 32 receives a new request from the WWW browser 40, it generates the operating process 33. The operating process 33 then transmits the request from the WWW browser 40 to the communication process 45 which resides in the service system 32 and maintains the session with the mainframe 42, and requests the mainframe 42 to perform the process for the request.

The operating process 33 does not request the mainframe 44 to perform all of processes for the requests from the WWW browser 40. If a process for a request from the WWW browser 40 is a process that the operating process 33 itself can perform, such as error notification to the WWW browser 40, etc., the operating process 33 does not transmit the request to the communication process 35, performs that process, and returns its result to the WWW browser 40.

The communication process 35 resides in the service system 32 and maintains the session with the mainframe 42 until the communication between the user 31 and the mainframe 42 is terminated after the user 31 issues a termination request, or until the session continuation monitoring unit 38 within the communication process 35 determines that the communication is terminated. The communication process 35 then monitors whether or not the data is transmitted from the operating process 33 by making the synchronizing unit poll the user file 43 having the file name corresponding to the user ID of the user 31 that the communication process 35 itself corresponds to. When the operating process 33 performs a write operation to the user file 43, the written data is read from the communicating unit in the communication process 35 and transmitted to the mainframe 42.

As described above, the service system 32 according to this embodiment implements the link process between the user 31 and the mainframe 22.

When the link process between the WWW browser 40 and the second program 44 is completed and the user 31 logs off, the user 31 transmits a termination request. The following steps S121 through S135 implements the operations performed at that time.

The user 31 issues the termination request when he or she logs off from the main frame 42, and transmits the request to the mainframe 42 via the service system 32.

In step S121, the WWW browser 40 establishes the connection to the operating process 33 configuring the service system 32, and transmits the termination request to the operating process 33.

In step S122, the user file 43 corresponding to the ID included in the request received, here, the user file 43 generated in step S102 is searched by the partner program identifying unit in the operating process 33. The process then goes to steps S123 and S124.

In steps S123 and S124, the synchronizing unit performs a polling process, and determines whether or not the operating process 33 writes the request to the user file 43.

In step S125, the session continuation monitoring unit in the communication process 35 monitors whether or not the operating process 33 writes the request (data) from the WWW browser 31 to the user file 43 during a predetermined period according to the result of the polling process performed by the synchronizing unit. When the predetermined amount of time elapses although the request is not written to the user file 43, the session continuation monitoring unit determines that the communication with the user 31 is completed, and terminates the communication process 35.

The communicating unit in the operating process 33 writes the request to the user file 43 in step S126, and the communicating unit in the communication process 35 reads the written request from the user file 43 when the synchronizing unit detects the write operation of the request, in step S127. Then, the operating process 33 transmits the request to the communication process 35.

In step S128, the communication process 35 transmits the request to the mainframe 42.

In step S129, the second program 44 in the main frame 42 returns the process result (in this case, the result of the termination process since the termination request is made) to the communication process 35 as a reply to the request.

In steps S130 and S131, the synchronizing unit determines whether or not the request is written to the user file 43 by performing the polling process.

The communicating unit in the communication process 35 writes the process result from the mainframe 42 to the user file 43 in step S132, and reads out the written result in step 133. As a result, the communication process 35 transmits the reply to the operating process 33.

In step S134, the communication process 35 terminates its process.

In step S135, the operating process returns the reply to the WWW browser 40, and terminates its process.

In step S136, the WWW browser 40 terminates its process.

In the above described steps S121 through S136, the operating process 33 terminates. its process and disappears after it performs the transmission/reception to/from the WWW browser 40 once in a one-to-one correspondence. Additionally, the communication process 35 performs the transmission/reception to/from the second program 44 of the mainframe 42, terminates its process, and disappears.

Figure 5:
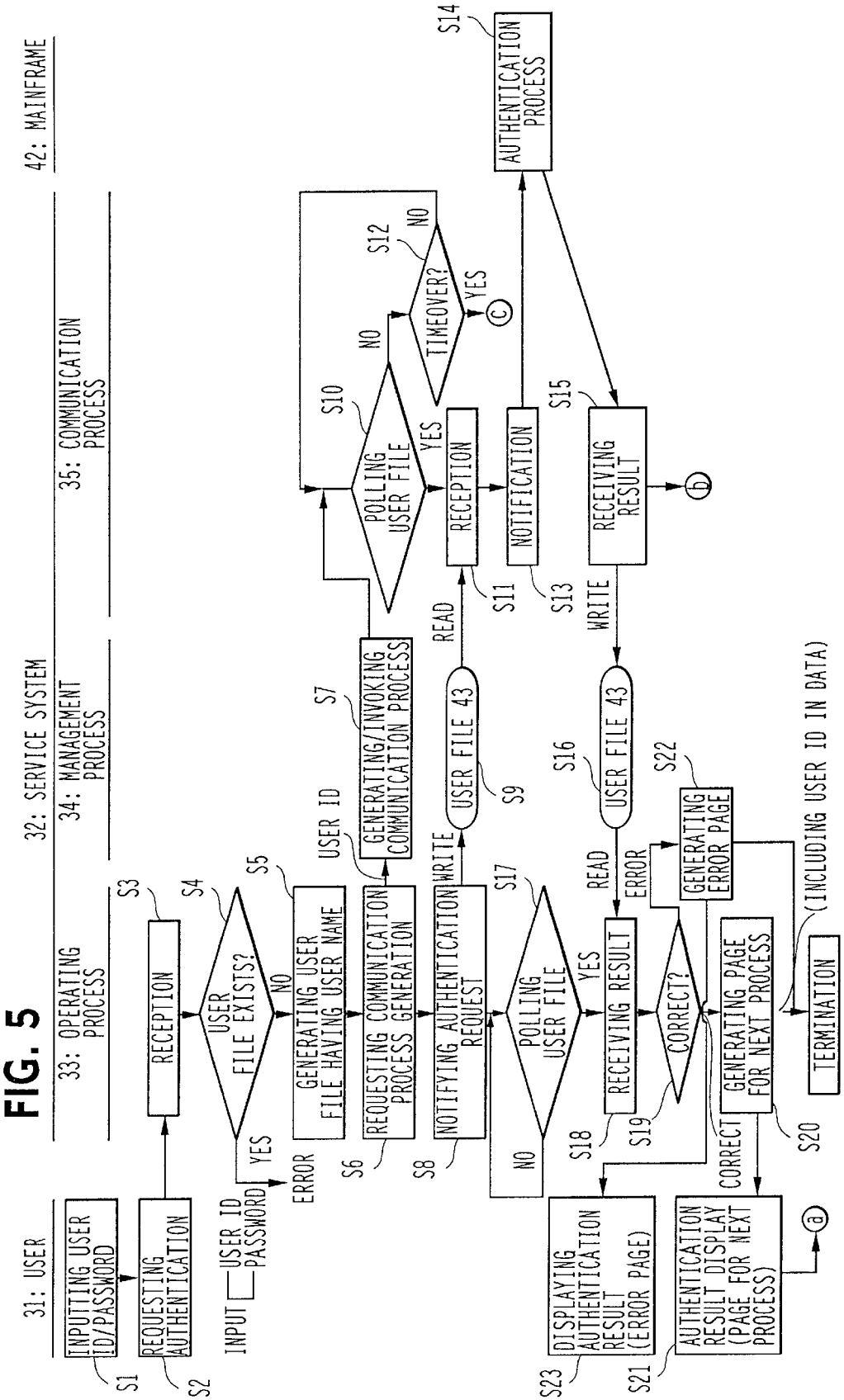
FIG. 5 is a flowchart showing the process operations performed when a user requests authentication.
Figure 6:
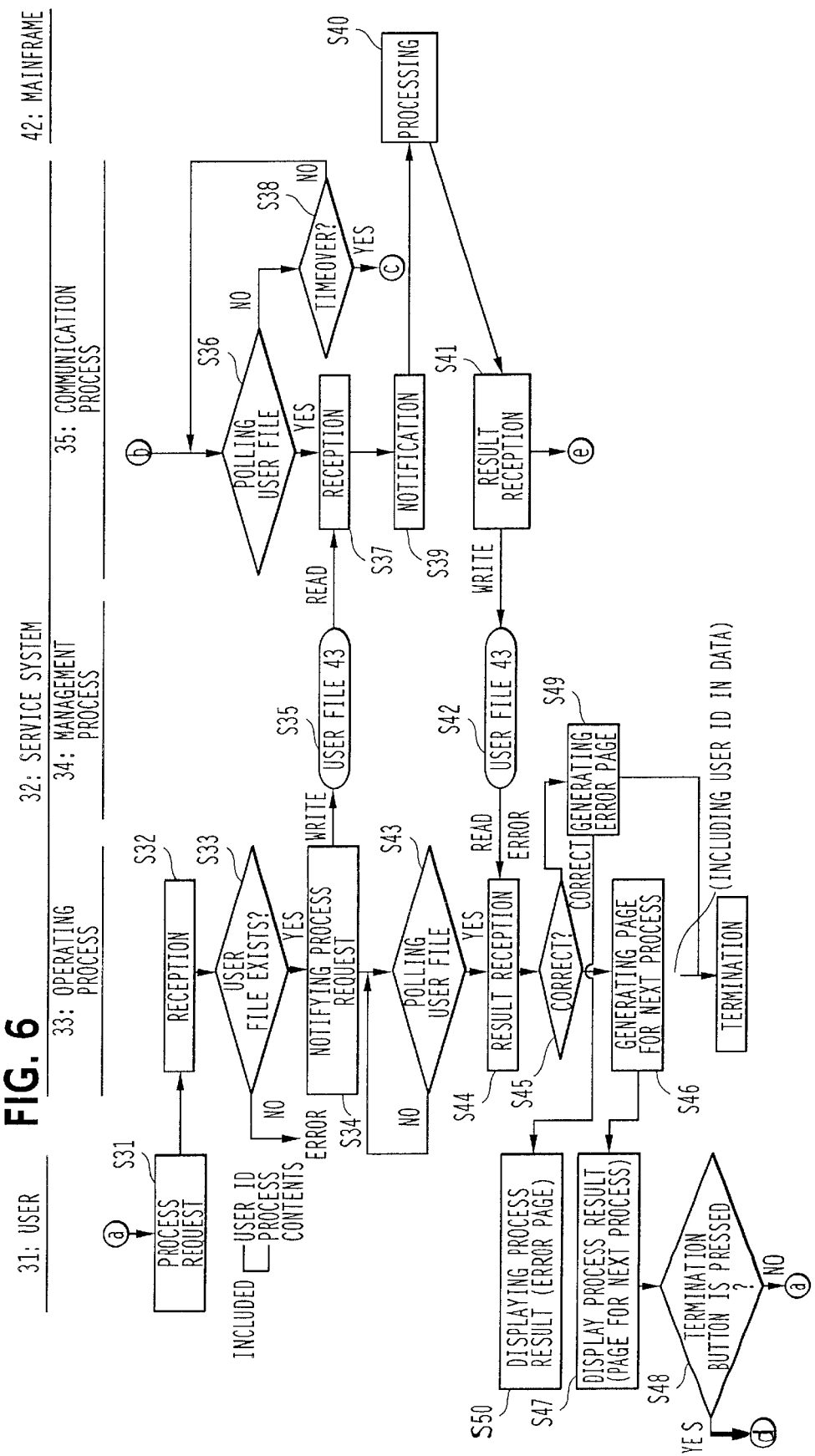
FIG. 6 is a flowchart showing the process operations performed when the user requests a service.
Figure 7:
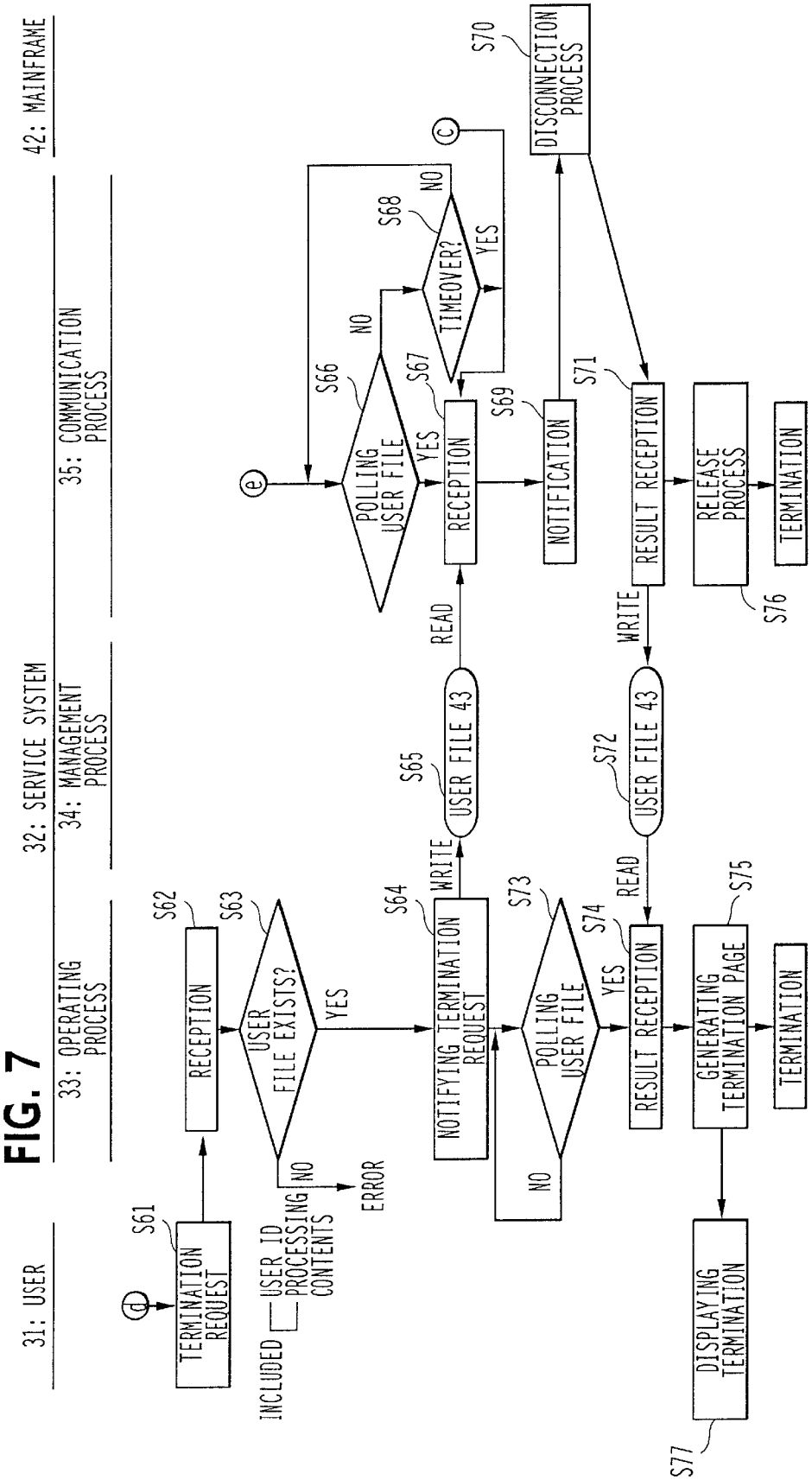
FIG. 7 is a flowchart showing the process operations performed when the user requests a termination.

Provided next is the explanation about the details of the operations performed by the system configured as shown in FIG. 4, by referring to FIGS. 5, 6 and 7.

FIG. 5 is a flowchart explaining the operations performed when the user 31 is authenticated. The flowchart shown in FIG. 5 is a procedure performed when the user 31 initially issues an authentication request to the mainframe 42 and performs an authentication process in order to link to the mainframe 42. Here, the user 31, service system 32, operating process 33, management process 34, communication process 35, and the mainframe 42 correspond to the respective components shown in FIG. 4.

In FIG. 5, once the process is started, the user ID and the password are input in step S1.

In step S2, an authentication request is transmitted together with the user ID and the password.

In step S3, the operating process 33 in the service system 42 receives the authentication request, user ID, and password, which are transmitted in step S2.

In step S4, it is determined whether or not there is the user file 43 having the file name corresponding to the user ID transmitted together with the authentication request. Since the authentication request has been made in this case, it is determined that there is no corresponding user file 43. The process therefore goes to step S5. If it is determined that there is the corresponding user file 43, this becomes an error (since this is the initial connection and the user file 43 should not be generated, it becomes an error if it exists).

In step S5, the operating process 33 generates the user file 43 having the file name corresponding to the user ID of the user 31.

In step S6, a request to generate the communication process 35 together with the user ID of the user 31 are transmitted to the management process 34.

In step S7, the management process 34 generates/invokes the communication process 35 corresponding to the transmitted user ID.

In step S8, the operating process 33 writes the authentication request together with the user ID and the password to the user file 43.

In step S9, the authentication request from the operating process 33 is stored in the user file 43.

After being generated and invoked, the communication process 35 polls the corresponding user file 43, and determines whether or not the operating process 33 performs the write operation to the user file 43, in step S10. If "YES" in step S10, it is determined that the authentication request has been written to the user file 43. Therefore, the process goes to step S11. If "NO" in step S10, the communication process 35 is in a wait state until the request (data) is written to the user file 43. In step S12, the communication process 35 monitors whether or not a predetermined amount of time elapses. If "YES" in step S12, the session with the user 31 is determined to be released, and a release process (a process for terminating the communication process 35, etc.) is performed in and after step S69 of FIG. 7, which will be described later.

In step S11, the communication process 35 receives the result by reading the authentication request together with the user ID and the password from the user file 43.

In step S13, the communication process 35 notifies the mainframe 42 of the authentication request, the user ID, and the password.

In step S14, the mainframe 42 performs an authentication process, and returns its result to the service system 32.

In step S15, the communication process 35 receives the result of the authentication process from the mainframe 42, and writes the result to the corresponding user file 43.

In step S16, the result of the authentication process, which is written to the user file 43, is stored.

In the meantime, after step S8, the operating process 33 polls the corresponding user file 43, and determines whether or not the communication process 35 writes the result of the process performed for the authentication request to the user file 43 in step S17. If the result of the determination is "YES" in step S17, the result of the authentication process is determined to have been written to the user file 43. Therefore, the process goes to step S18. If the result of the determination is "NO", the result of the authentication process is not determined to have been written to the user file 43. Accordingly, the process repeats S17 and enters into a wait state.

In step S18, the operating process 33 receives the result by reading out the result of the authentication process from the user file 43.

In step S19, the operating process 33 determines whether or not the received result is the one which is properly authenticated. If "YES", the operating process 33 generates the data of the page for displaying the next process, attaches the user ID to the data, and transmits the data to the user 31 in step S20. If "NO" in step S19 (the received data is determined to be an error), the operating process 33 generates the data of the page for displaying an error and transmits the generated data to the user 31 in step S22. The operating process 33 terminates its process and disappears after it transmits the display data corresponding to the result of the authentication process.

In step S21, the result of the authentication process indicating that the user 31 is properly authenticated and the page corresponding to the next process are displayed for the user 31. Control is then transferred to step S31 of FIG. 6, where the process in response to the service request is performed.

In step S23, an error page for notifying an error such as unauthentication, etc. is displayed.

As described above, the process performed in response to the authentication request that the user 31 made to the mainframe 42 is completed.

Provided next is the explanation about the process performed in response to the service request made from the user 31 who has been authenticated, by referring to FIG. 6.

FIG. 6 is a flowchart showing the process performed in response to the service request made by the user 31. The flowchart shown in this figure is a procedure performed when the user 31 notifies the mainframe 42 of a second or subsequent request, that is, the request after the authentication request, and the corresponding process is performed. Here, the user 31, the service system 32, the operating process 33, the management process 34, the communication process 35, and the mainframe 42 correspond to the respective components shown in FIG. 4.

In FIG. 6, the user 31 transmits a process request (data) indicating the contents of the service request and including the user ID in step S31.

In step S32, the operating process 33 in the service system 32 receives the process request transmitted in step S31.

In step S33, it is determined whether or not there is the user file 43 having the file name corresponding to the user ID included in the process request. Since this request is made after the authentication request and the user file 43 is generated at the time of the authentication request in this case, the result of the determination is "YES". The process then goes to step S34. If "NO", the result becomes an error (this is because the user file 43 was not generated despite the second request).

In step S34, the operating process 33 writes the process request to the user file 43.

In step S35, the process request, which is written to the user file 43, is stored.

In step S36, the communication process 35 polls the corresponding user file 43, and examines whether or not the operating process 33 performs a write operation to the user file 43. If "YES" in step S36, it is determined that the process request has been written to the user file 43. Therefore, the process goes to step S37. If "NO" in step S36, the communication process 35 is in a wait state until the process request (data) is written to the user file 43. In step S38, the communication process 35 monitors whether or not a predetermined amount of time elapses. If "YES" in step S38, the session with the user 31 is determined to be released, and a release process (a process for terminating the communication process 35, etc.) is performed in and after step S69 of FIG. 7, which will be described later.

In step S37, the communication process 35 reads the process request from the user file 43 and receives In step S39, the communication process 35 notifies the mainframe 42 of this process request.

In step S40, the mainframe 42 performs a process in response to the process request, and returns its result to the service system 32 as a reply.

In step S41, the communication process 35 receives the process result, and writes the result to the corresponding user file 43.

In step S42, the process result, which is written to the user file 43, is stored.

In the meantime, after step S34, the operating process 33 polls the corresponding user file 43, and determines whether or not the result of the process performed in response to the process request made in step S34 has been written in step S43. If "YES", the process goes to step S44 since it is determined that the process result has been written to the user file 43. If "NO" in step S43, it is not determined that the process result has been written to the user file 43. Accordingly, the operating process 33 repeats step S43, and enters into a wait state.

In step S44, the operating process 33 reads the process result from the user file 43, and receives it.

In step S45, the operating process 33 determines whether or not the process result is correct. If "YES", the operating process 33 generates the data of the page for displaying the process result and the next process, attaches the user ID to the data, and transmits it to the user 31. The operating process 33 then terminates its process and disappears. If the process result is determined to be an error such as an error that the process cannot be performed as requested within the main frame 42, etc., the operating process 33 generates the data of the page for displaying an error, and transmits the data to the user 31 in step S49. The operating process 31 then terminates its process and disappears.

In step S47, the operating process 33 displays the process result (the page for the next process).

In step S48, it is determined whether or not a termination button used for requesting the termination of the link process in the page displayed in step S47 is pressed. If "YES", the process goes to step S61 of FIG. 7. If "NO", the process goes to step S31 of FIG. 6, and accepts the next request.

In step S50, the operating process 33 displays the error page for notifying the process result as an error.

With the above described process, the process performed in response to the process request such as the service request, etc. that the user 31 makes to the mainframe 42 is completed. This process is repeated until the termination button is pressed and the termination request is issued in step S48.

Provided next is the explanation about the process performed when the termination button is pressed and the termination request is issued in step S48, by referring to FIG. 7.

FIG. 7 is a flowchart showing the process for terminating the link process between the user 31 and the mainframe 42. The flowchart shown in this figure is a procedure with which the user 31 notifies the mainframe 42 of the termination request and performs a release process. Here, the user 31, service system 32, operating process 33, management process 34, communication process 35, and the mainframe 42 correspond to the respective components shown in FIG. 4.

In FIG. 7, the termination request (data) which includes both the termination process as the process contents and the user ID is transmitted in step S61.

In step S62, the operating process 33 in the service system 42 receives the termination request transmitted in step S61.

In step S63, it is determined whether or not there is the user file 43 having the file name corresponding to the user ID included in the process request. Since this is the second or subsequent request and the user file has been generated, the result of the determination is "YES" in this case. Therefore, the process goes to step S64. If the result of the determination is "NO" in step S63, it will become an error (this is because the user file 43 has not been generated despite the second or subsequent request).

In step S64, the operating process 33 writes the termination request to the user file 43.

In step S65, the termination request is stored in the user file 43.

In step S66, the communication process 35 polls the corresponding user file 43, and determines whether or not the operating process 33 performs a write operation to the user file 43. If "YES" in step S66, the termination request is determined to have been written to the user file 43. Accordingly, the process goes to step S67. If "NO" in step S66, the communication process 35 is in a wait state until the process request (data) is written to the user file 43. The communication process 33 monitors whether or not a predetermined amount of time elapses in step S68. If "YES" in step S68, the session between the user 31 and the operating process 33 is determined to be released. Therefore, the process goes to step S69.

In step S67, the communication process 35 reads the termination request from the user file 43, and receives it.

In step S69, the communication process 35 notifies the mainframe 42 of this termination request.

In step S70, the mainframe 42 performs a release process (termination process), and returns its result.

In step S71, the communication process 35 receives the process result, and writes the result to the corresponding user file 43. Then, the communication process 35 terminates its process and disappears after it deletes the corresponding user file 43 at appropriate timing in step S76.

In step S72, the result of the process performed in response to the termination request is written to the user file 43.

In the meantime, after step S64, the operating process 33 polls the user file 43, and determines whether or not the communication process 35 writes the result in response to the transmitted request in step S73. If "YES" in step S73, the termination request is determined to have been written to the user file 43. Accordingly, the process goes to step S74. If "NO" in step S73, the result is not determined to have been written to the user file 43. Therefore, the operating process 33 repeats step S73, and enters into a wait state.

In step S74, the operating process 33 receives the result by reading the result of the termination process from the user file 43.

In step S75, the operating process 33 generates the data of a termination page according to the read process result, and transmits it to the user 31. The operating process then terminates its process, and disappears.

In step S77, the user 31 displays the termination according to the transmitted data.

With the above described process, the termination (release) process between the user 31 and the mainframe 42 is completed according to the termination request made by the user 31.

Figure 8:
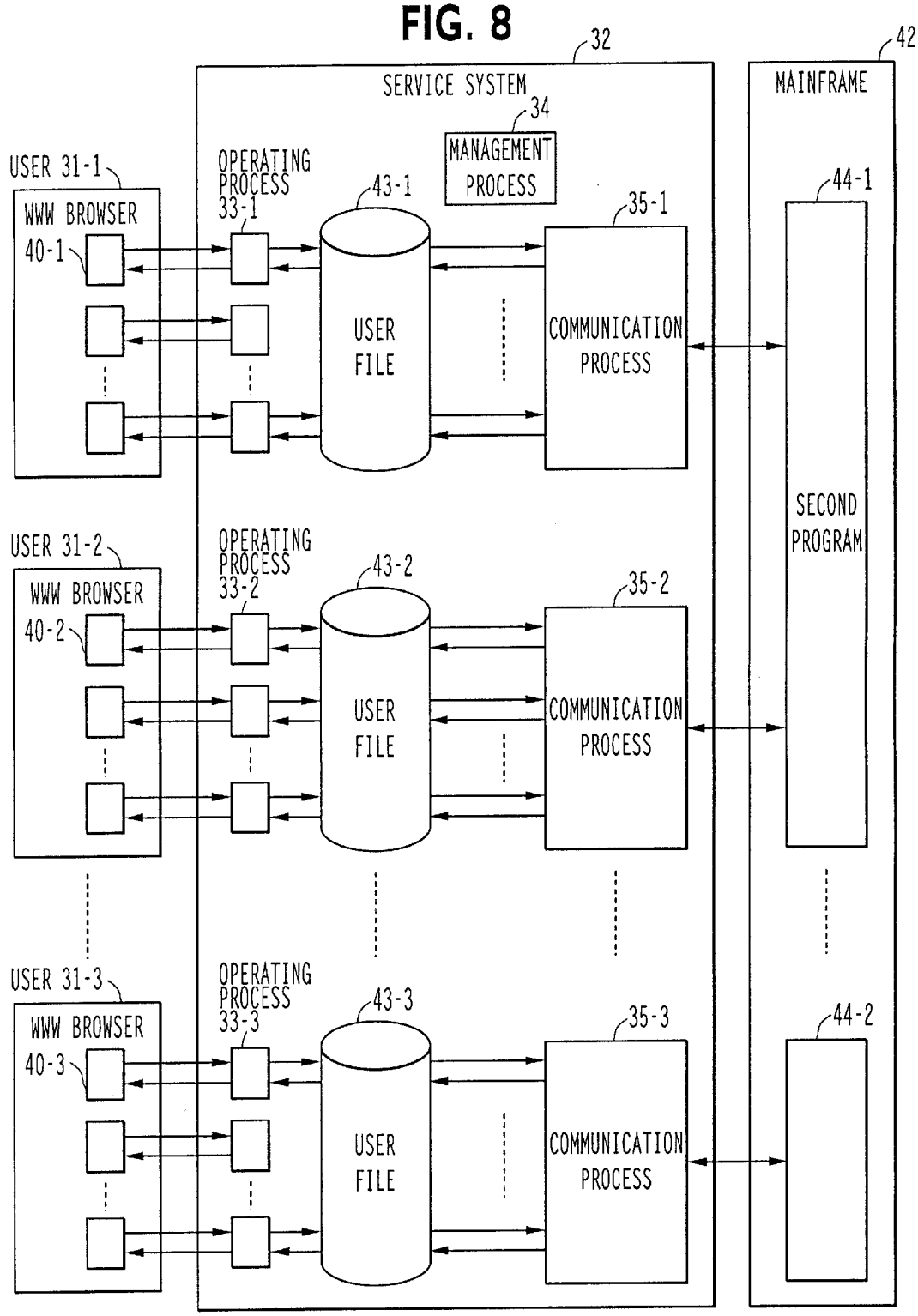
FIG. 8 is a schematic diagram showing the configurations of processes within a service system 32 when accepting the three requests made from the user.

FIG. 8 is a schematic diagram showing the configuration of each of the processes within the service system 32 when the requests from users 31-1, 31-2, and 31-3 are accepted.

As described above, in the service system 32, the operating process 33 responsible for the communication with any of the users 31 is generated at each session for any of the users 31 who makes a connectionless communication, while the communication process 35 responsible for the communication with the mainframe 32 is generated for each user 31, for the mainframe 42 which makes a connection communication for maintaining the connection until the communication terminates.

The operating process 33 processes a request from the user 31 if the operating process 33 itself can process the request, and notifies the user 31 of the process result. If the operating process 33 itself cannot process the request from the user 31, it transmits the request from the user 31 to the communication process 35 via the user file 43. The communication process 35 then transmits this request to the mainframe 42. Additionally, the communication process 35 receives the process result from the mainframe 42, and transmits it to the operating process 33 via the user file 43. The operating process 33 then transmits it to the user 31.

As described above, the service system 32 according to this embodiment implements a link process between devices or programs for performing a communication process, whose connection forms are different.

Provided next is the explanation about another embodiment in which queues are arranged in a service system, and the communication between an operating process and a communication process is performed using the queues. The following explanation does not include the same portions as those described earlier in this specification.

Figure 9:
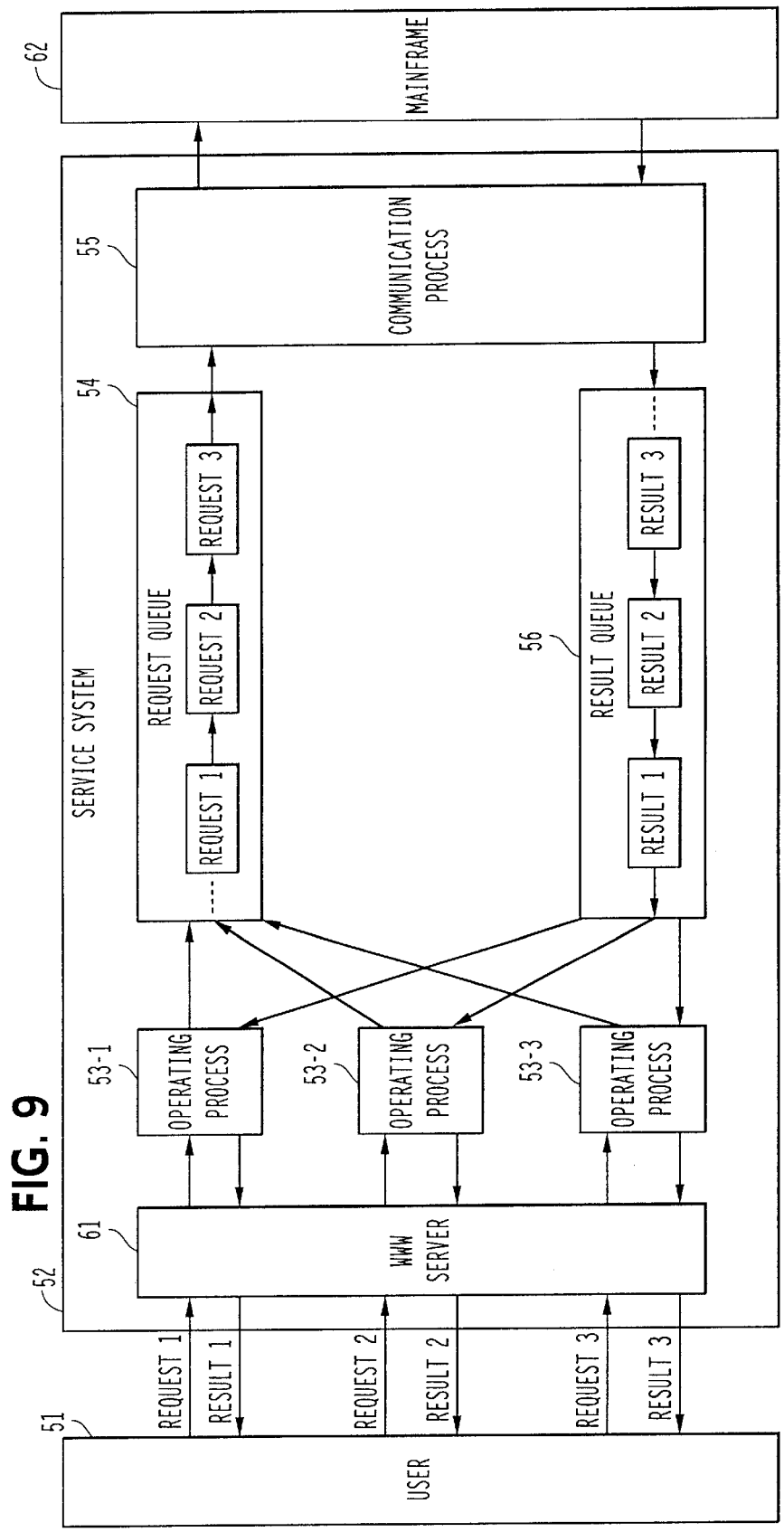
FIG. 9 is a schematic diagram showing the simplified configuration of the service system using queues.

A service system 52 shown in FIG. 9 internally generates a request queue 54 and a result queue 56 for each user depending on need, and makes the communication between an operating process 53 and a communication process 55 using these queues. The queues are generated by each of operating processes 53, and disappears when the communication between a user 51 and a mainframe 62 terminates, similar to the user file 43 of FIG. 4.

With the service system 32 using the user file 43 according to a named pipe, which is shown in FIG. 4, only a single instruction from one user can be processed. The service system 52 using the queues, however, can perform a parallel process for accepting and processing a new request even if a user transmits the new request before it obtains the result of the previous request from the user.

Provided next is the explanation about the case in which the parallel process is performed.

The difference between the service systems 52 and 32 when the process for authenticating the user is performed is: the operating process generates a user file, and the communication between the operating process and the communication process is made by using the user file in the service system 32, while the request and instruction queues are generated, and the communication between the operating process and the communication process is made by using these queues in the service system 52. Therefore, the following explanation will refer to the process after the user 51 is authenticated.

First of all, the user 51 issues a request 1 which is a service request to a mainframe 62, and transmits it to the service system 52.

The request 1 is then passed to the operating process 53-1 which is generated upon receipt of the request 1 via a WWW server 61.

The operating process 53-1 attaches an ID for identifying the process itself to the request 1, and links this request to the request queue 54 corresponding to the user ID attached to the request 1.

The communication process 55 extracts one request from the beginning of the request queue 54 corresponding to the process itself, passes it to the mainframe 62, and makes the mainframe 62 process it.

Assume that the user 51 issues a request 2 which is a new service request and transmits the request 2 to the service system 52 before he or she obtains the process result of the request 1, and newly issues and transmits a request 3 before he or she obtains the process results of the requests 1 and 2.

The service system 52 generates the operating processes 53-2 and 53-3 for the requests 2 and 3, and accepts these requests 2 and 3.

The operating processes 53-2 and 53-3 respectively attach IDs for identifying the processes themselves to the requests 2 and 3, and link the requests 2 and 3 to the request queue 54 corresponding to the user IDs attached to the requests 2 and 3.

As described above, the service system 52 sequentially accepts the requests transmitted from the user 51, and stores them in the request queue 54.

When the communication process 55 requests the mainframe 62 to perform the process for the request 1 and the mainframe 62 performs this process, the communication process 55 sequentially extracts a request, passes the extracted request to the mainframe 62, and makes the mainframe 62 process them if any request is left in the request queue 54. In FIG. 9, the request queue 54 includes the requests 2 and 3, and the communication process 55 sequentially extracts and processes them.

When the mainframe 62 returns the process result of the request to the service system 52, the communication process 55 links the result to the result queue 56 by arranging the order depending on need. For example, if the requests 1, 2, and 3 are associated with each other, and their process order is a problem, the communication process 55 arranges the output order of these requests to the mainframe 62 and the output order of process results to the result queue 56, and adjusts the timing.

After each of the operating processes 53 transmits a request to the request queue 54, it monitors the result queue 56 corresponding to the user 51. If it detects the process result attached with the ID corresponding the process itself, it extracts this result from the result queue 56 and outputs the result to the user 51.

Note that the extraction of the process result from the result queue 56 may be implemented not by that the operating process 53 actively waits for the process result, but by that the user 51 issues a result extraction request and the operating process 53 searches the result queue 56 for the process result attached with the ID corresponding to the operating process 53 itself. If the requested process result is not found in the result queue 56, the operating process 53 generates the data for notifying, for example, "under process", etc. and outputs it to the user 51.

Additionally, the service system 52 shown in FIG. 9 generates the request queue 54 for accepting requests and the result queue 56 for accepting process results for each user. However, the queues are not limited to these implementations. A request and its result may be stored in the same queue, or a pair of queues may be arranged for a plurality of users. If a request and its result are handed in the same queue, for example, the data format of the request is changed in order to arrange a region storing the result before the operating process stores the request in the queue. Then, the operating process outputs the request to the queue.

Additionally, if the operating process 53 actively extracts a process result from the result queue 56, the result queue 56 may be implemented as not a queue but a user file using a named pipe.

Furthermore, a stack may be arranged in a service process. The communication between the operating process and the communication process can be made not by using queues, but by using the stack.

The above described implementation may be arranged in a memory or in a file.

Figure 10:
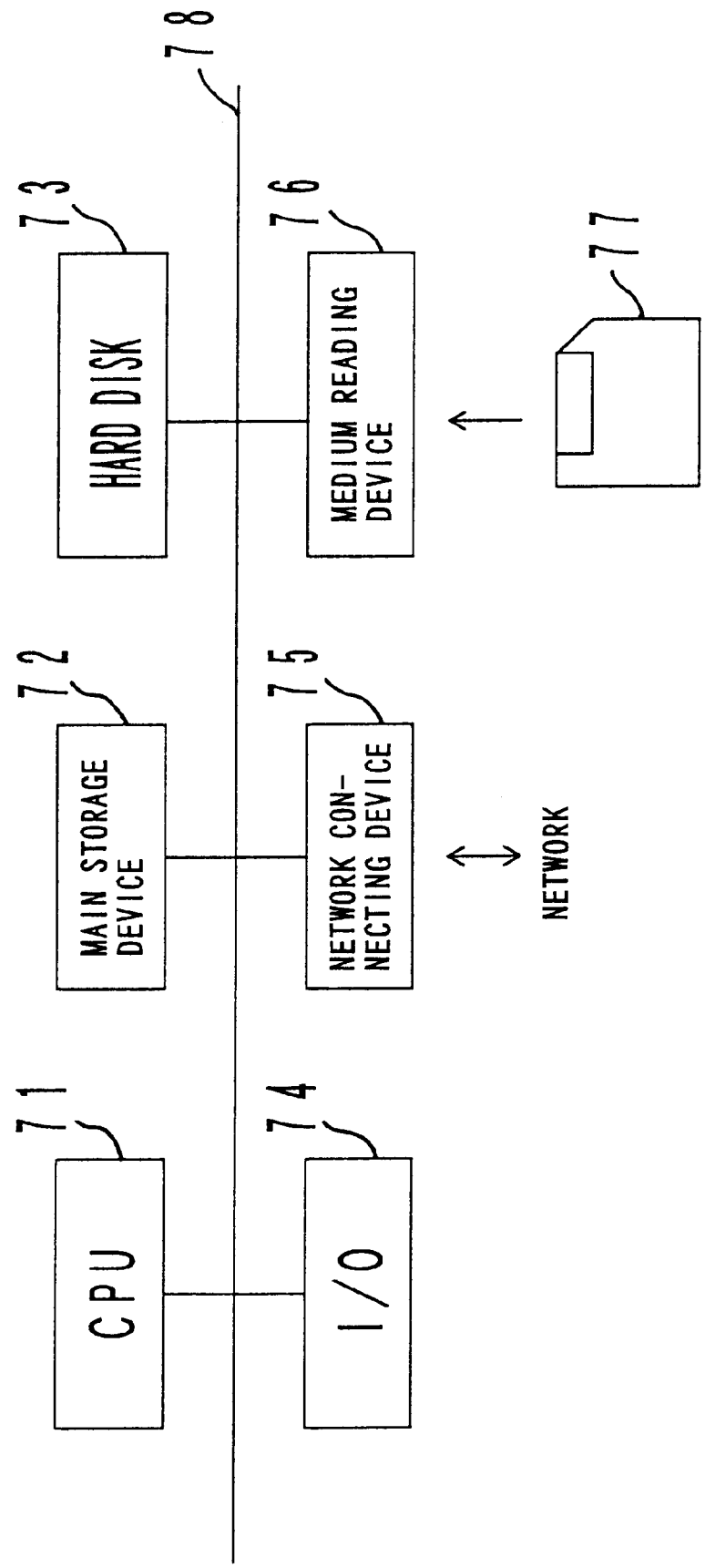
FIG. 10 is a schematic diagram showing the environment of an information processing system to which the system according to the present invention is applied.
Figure 11:
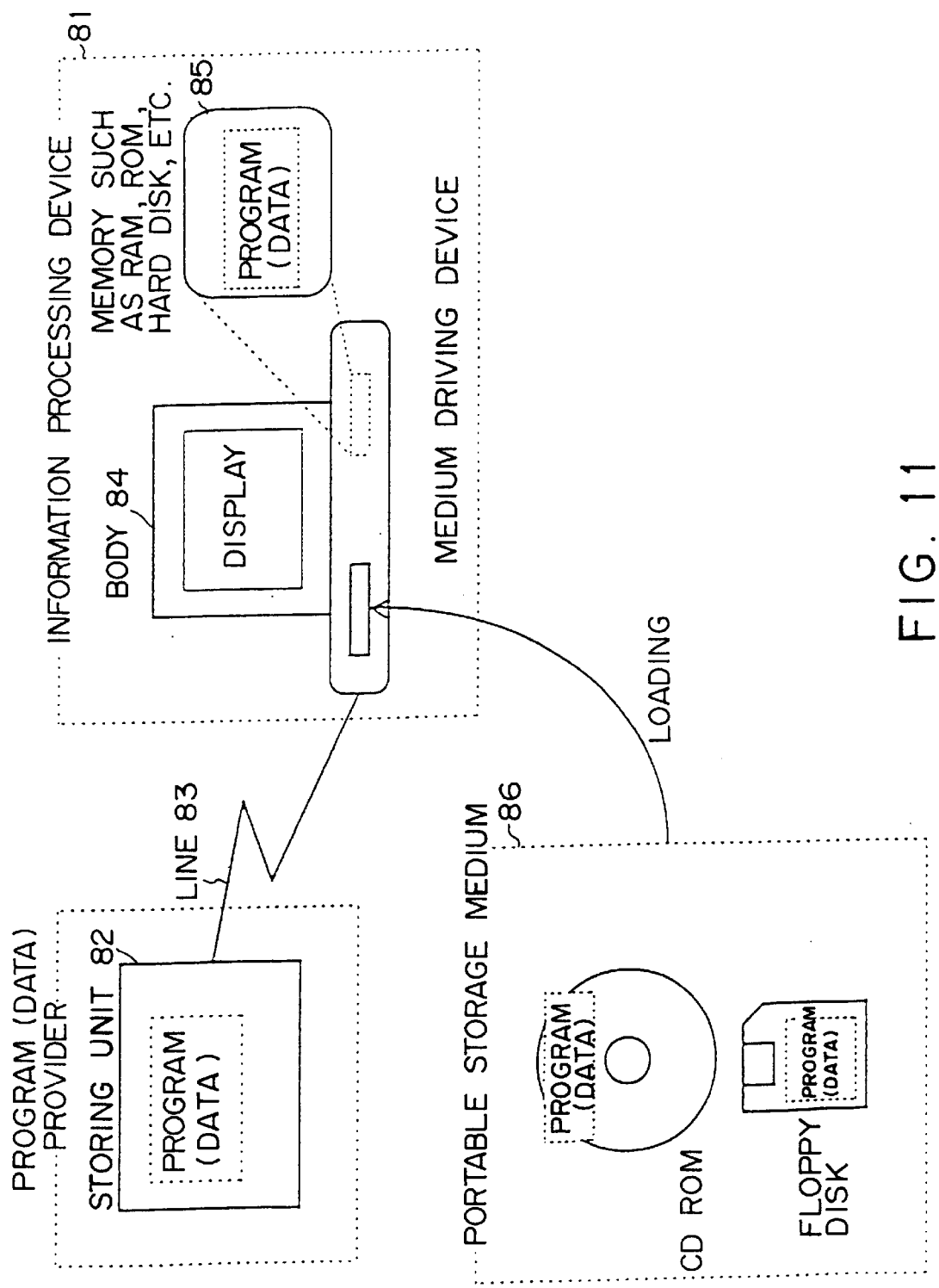
FIG. 11 exemplifies a storage medium.

FIG. 10 is a schematic diagram showing the environment of an information processing system to which the linking system according to this embodiment is applied.

This information processing system comprises a CPU 71, a main storage device 72, a hard disk device 73, input/output (I/O) devices 74 such as a display, a keyboard, etc., a network connecting device 75 such as a modem, etc., and a medium reading device 76 for reading stored contents from a portable storage medium such as a disk, a magnetic tape, etc. These constituent elements are connected via a bus 78.

With the information processing system shown in FIG. 10, a program and data stored onto a storage medium 77 such as a magnetic tape, a floppy disk, a CD-ROM, an MO, etc., is read by the medium reading device 76, and the program and data are downloaded into the main storage device 72 and/or the hard disk 73. The processes performed in this embodiment may be implemented in the form of software with the program and data that the CPU 71 executes.

Additionally, application software may be sometimes replaced by using the storage medium 77 such as a floppy disk, etc. in this information processing system. Accordingly, the present invention is not limited to the inter-program linking system and the method thereof. It may be implemented as a computer-readable storage medium 77 for directing a computer to perform the capabilities according to the above described embodiment of the present invention, when used by the computer.

In this case, the storage medium includes a portable storage medium 86 such as a CD-ROM disk and a floppy disk (or an MO disk, a DVD, a removable hard disk, etc.), a storing unit (a database, etc.) within an external device (a server, etc.), to which data is transmitted via a network line 83, a memory 85 (a RAM or a hard disk, etc.) in the body 84 of the information processing device 81, etc. A program stored in the portable storage medium 86 or the storing unit (a database, etc.) 82 is loaded into the memory (a RAM or a hard disk, etc.) in the body 84, and executed.

As described above, according to the present invention, an operating process which is generated and extinguished at each session is generated on a connectionless communication side, while a communication process which stays resident and maintains a line on a connection communication side, so that the link process is implemented by making a communication between the operating process and the communication process.

Consequently, a program from a user, which terminates at each process, and a program which can perform various processes in the state in which its session is maintained, can be linked in a one-to-one correspondence without imposing a load on a system. Accordingly, a new service can be easily provided without replacing a server that a conventional user uses and giving any influence on a conventional service.

What is claimed is:

1. An inter-program linking system for linking a program running on a first information processing device which makes a connectionless communication, and a program running on a second information processing device which makes a connection communication, comprising:

an operating process generating unit generating an operating process which communicates with the first information processing device in correspondence with a user ID for uniquely identifying a transmitting source, which is attached to data, upon receipt of the data from the first information processing device; and a communication process generating unit generating a communication process which communicates with the second information processing device, which corresponds to the user ID and is instructed by the data, according to an instruction from the operating process, wherein the operating process and the communication process communicate with one another to form a link between the program running on the first information processing device and the program running on the second information processing device.

2. The inter-program linking system according to claim 1, wherein the operating process examines whether or not a user file corresponding to the user ID exists, writes the data received from the first information processing device to the user file if the user file exists, requests said communication process generating means to generate the communication process and generates the user file corresponding to the user ID if the user file does not exist, and writes the data received from the first information processing device to the user file.

3. The inter-program linking system according to claim 2, wherein the communication process reads out the data written by the operating process from the user file corresponding, to the same user ID as the user ID that the communication process itself corresponds to, transmits the data to the second information processing device, writes a process result received from the second information processing device to the user file; and the operating process reads out the process result written by the communication process from the user file.

4. The inter-program linking system according to claim 2, wherein the operating process and the communication process comprise a synchronizing unit detecting whether or not data is written to the user file that the operating process and the communication process themselves correspond to.

5. The inter-program linking system according to claim 2, wherein the communication process further comprises a session monitoring unit performing an error process if the operating process does not perform a write operation to the user file that the communication process itself corresponds to during a predetermined period.

6. The inter-program linking system according to claim 1, further comprising a queue, wherein a communication between the operating process and the communication process is performed via the queue.

7. The inter-program linking system according to claim 6, wherein said operating process generating unit generates an operating process corresponding to first data received from the first information processing device, and generates a new operating process for newly received data before the operating process gives a reply to the first data for the first processing device.

8. The inter-program linking system according to claim 6, wherein said operating process attaches an identifier for identifying said operating process itself to the data received from the first information processing device, transmits the data attached with the identifier to the queue, and receives a reply attached with the identifier; and the communication process extracts the data attached with the user ID that the communication process itself corresponds to from the queue, transmits the extracted data to the second information processing device, and transmits a reply from the second information processing device to the queue.

9. The inter-program linking system according to claim 1 is configured in the same device as the second information processing device.

10. The inter-program linking system according to claim 1 is configured independently from the first and second information processing devices.

11. A linking system for linking a communication between a first information processing device which makes a connectionless communication, and a second information processing device which makes a connection communication, comprising:

an operating process generating unit generating an operating process which communicates with the first information processing device in correspondence with a user ID for uniquely identifying a transmitting source, which is attached to data, upon receipt of the data from the first information processing device; and a communication process generating unit generating a communication process which communicates with the second information processing device, which corresponds to the user ID and is instructed by the data, according to an instruction from the operating process, wherein the operating process and the communication process communicate with one another to form a link between the first information processing device and the second information processing device.

12. An inter-program linking system for linking transmission and reception of data between programs, comprising:

a first program transmitting/receiving one of an ID of the first program itself as data, and data including the ID of the first program itself;

an operating process transmitting/receiving the data to/from the first program;

a communication process, which is invoked in correspondence with the ID at the time of first reception of the data transmitted from said first program, receiving only the data corresponding to the ID at the time of second or subsequent data reception, and terminating its process if the received data is a termination request;

a second program transmitting/receiving the data to/from said communication process, wherein the operating process and the communication process communicate with one another to form a link between the first program and the second program.

13. An inter-program linking system for linking transmission and reception of data between programs, comprising:

a first program for transmitting/ receiving one of an ID of the first program itself as data, and data including the ID of the first program itself;

an operating process, which is invoked when receiving the data from said first program and terminates when making a reply, for generating a file having the ID included in data as an identifier at the time of first reception of the data transmitted from said first program, and writing the data to the file;

a communication process, which is generated/invoked by the operating process at the time of the first reception, for receiving the data from said operating process by reading out the data when the data is written to the file having the ID as the identifier, and terminating its process if received data is a termination request; and a second program for transmitting/receiving the data to/from said communication process, wherein the operating process and the communication process communicate with one another to form a link between the first program and the second program.

14. The inter-program linking system according to claim 13, wherein if there is no file corresponding to the ID included in the data received by said operating process, the file having the ID as the identifier is generated, and the data is written to the file; and if there is the file having the ID as the identifier, the data is written to the file.

15. The inter-program linking system according to claim 13, wherein whether or not the data is written to the file is determined by polling the file.

16. The inter-program linking system according to claim 13, wherein whether or not the data is written to the file is determined; and whether to again write the data or to release a communication is inquired of said first program, if the data is written to the file although a predetermined amount of time elapses.

17. The inter-program linking system according to claim 13, wherein said communication process is terminated when finding that the data is not written to the file although a predetermined amount of time elapses.

18. The inter-program linking system according to claim 13, wherein said communication process receives next data, passes the received next data to said second program, and makes said second program process the next data while said second program processes previous data passed by the communication process.

19. The inter-program linking system according to claim 13, wherein if a load on said communication process becomes heavier, whether or not to reduce the load is inquired to said first program.

20. An inter-program linking method for linking a program running on a first information processing device which makes a connectionless communication and a program running on a second information processing device which makes a connection communication, by:

generating an operating process for communicating with the first information processing device in correspondence with a user ID for uniquely identifying a transmission source, which is attached to data, upon receipt of the data from the first information processing device; and generating a communication process for communicating with the second information processing device which corresponds to the user ID, and is instructed by the data, according to an instruction from the operating process, wherein the operating process makes a connectionless communication with the program running on the first information processing device;

the communication process makes a connection communication with the program running on the second information processing device; and a link between the program running on the first information processing device and the program running on the second processing device is performed by making a communication between the operating process and the communication process.

21. The inter-program linking method according to claim 20, wherein the communication between the operating process and the communication process is implemented by using a named pipe.

22. The inter-program linking method according to claim 20, wherein a queue is generated; and the communication between the operating process and the communication process is implemented by using the queue.

23. An inter-program linking method for linking transmission and reception of data between programs, comprising:

receiving one of an ID as data and data including the ID from a first program;

invoking a communication process in correspondence with the ID of the first program included in the data at the time of first reception of the data;

receiving only the data including the ID at the time of a second or subsequent reception;

terminating the communication process if the received data is a termination request;

transmitting and receiving the data between the first program and an operating process;

transmitting and receiving the data between the operating process and the communication process; and transmitting and receiving the data between the communication process and a second program, wherein the operating process and the communication process communicate with one another to form a link between the first program and the second program.

24. An inter-program linking method for linking transmission and reception of data between programs, comprising:

receiving one of an ID of a first program as data and data including the ID from the first program;

generating an operating process for generating a file having the ID as an identifier, generating/invoking a communication process which receives the data by reading out the data when the data is written to the file, and which terminates if received data is a termination request, at the time of first reception of the data, and generating an operating process which writes the data to the file; and transmitting/receiving the data to/from the second program via the communication process, wherein the operating process and the communication process communicate with one another to form a link between the first program and the second program.

25. A computer-readable storage medium directing a computer to perform a process of:

generating an operating process to communicate with a first information processing device that makes a connectionless communication, the operating process corresponding to a user ID for uniquely identifying a transmission source, the user ID being attached to data received from the first information processing device; and generating a communication process to communicate with a second information processing device that makes a connection communication, the communication process corresponding to the user ID and being instructed by the data, according to an instruction from the operating process, wherein the operating process and the communication process communicate with one another to form a link between the first information processing device and the second information processing device.

26. A computer-readable storage controlling a computer and comprising a process of:

receiving one of an ID as data and data including the ID from a first program;

invoking a communication process in correspondence with the ID of the first program at the time of first reception of the data;

receiving only the data including the ID at the time of a second or subsequent reception;

terminating the communication process if the received data is a termination request;

transmitting and receiving the data between the first program and an operating process;

transmitting and receiving the data between the operating process and the communication process; and performing transmission/reception of the data between the communication process and the second program, wherein the operating process and the communication process communicate with one another to form a link between the first program and the second program.

27. A computer-readable storage medium used to direct a computer to perform the functions of:

receiving one of an ID of a first program itself as data and data including the ID of the first program itself from the first program;

generating an operating process for generating a file having the ID as an identifier, generating/invoking a communication process which receives the data by reading out the data when the data is written to the file, and which terminates if received data is a termination request, at the time of first reception of the data, and generating an operating process which writes the data to the file; and transmitting/receiving the data to/from the second program via the communication process.

* * * * *

UNITED STATES PATENT AND TRADEMARK OFFICE
CERTIFICATE OF CORRECTION

PATENT NO. : 6,470,340 B1
DATED : October 22, 2002
INVENTOR(S) : Emiko Kawai et al.

It is certified that error appears in the above-identified patent and that said Letters Patent is hereby corrected as shown below:

<u>Column 17,</u>
Line 2, delete "means" and insert -- unit --.

Signed and Sealed this

Third Day of June, 2003

JAMES E. ROGAN
*Director of the United States Patent and Trademark Office*